United States Patent
Hyun et al.

(10) Patent No.: US 12,348,071 B2
(45) Date of Patent: Jul. 1, 2025

(54) ACTIVATION PROTOCOL GENERATING METHOD, AND ACTIVATION METHOD AND DEVICE USING SAME

(71) Applicant: LG ENERGY SOLUTION, LTD., Seoul (KR)

(72) Inventors: Sung-Sik Hyun, Daejeon (KR); Hyun Park, Daejeon (KR); Hyun-Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 543 days.

(21) Appl. No.: 17/796,716

(22) PCT Filed: Oct. 15, 2021

(86) PCT No.: PCT/KR2021/014413
§ 371 (c)(1),
(2) Date: Aug. 1, 2022

(87) PCT Pub. No.: WO2022/080973
PCT Pub. Date: Apr. 21, 2022

(65) Prior Publication Data
US 2023/0061221 A1    Mar. 2, 2023

(30) Foreign Application Priority Data

Oct. 16, 2020   (KR) .................. 10-2020-0134301

(51) Int. Cl.
*H02J 7/00* (2006.01)

(52) U.S. Cl.
CPC .......... *H02J 7/0069* (2020.01); *H02J 7/0042* (2013.01)

(58) Field of Classification Search
CPC .............................. H02J 7/0042; H02J 7/0069
See application file for complete search history.

(56) References Cited

U.S. PATENT DOCUMENTS

| | | |
|---|---|---|
| 2002/0145405 A1 | 10/2002 | Murakami et al. |
| 2011/0236751 A1 | 9/2011 | Amiruddin et al. |

(Continued)

FOREIGN PATENT DOCUMENTS

| | | |
|---|---|---|
| JP | 2002-313412 A | 10/2002 |
| JP | 2008-192532 A | 8/2008 |

(Continued)

OTHER PUBLICATIONS

International Search Report (PCT/ISA/210) issued in PCT/KR2021/014413 mailed on Jan. 24, 2022.

(Continued)

*Primary Examiner* — Robert Grant
(74) *Attorney, Agent, or Firm* — Birch, Stewart, Kolasch & Birch, LLP

(57) ABSTRACT

A method of generating a charge/discharge protocol of an additional charging/discharging operation included in an activation method with respect to assembled secondary batteries is provided. The method includes operation (a) of measuring a secondary battery thickness increase rate over time while repeating charging/discharging between a first voltage and a second voltage higher than the first voltage with respect to a first secondary battery; operation (b) of performing, at least once, an operation of performing operation (a) with respect to a second secondary battery after fixing the second voltage and changing the first voltage; operation (c) of determining one of first voltages except for a first voltage at a lowest rate from among measured secondary battery thickness increase rates as a lower limit voltage; and operation (d) of setting a protocol so that charging/discharging is repeated between the lower limit voltage and the second voltage.

12 Claims, 8 Drawing Sheets

(56) References Cited

U.S. PATENT DOCUMENTS

| | | |
|---|---|---|
| 2012/0056590 A1 | 3/2012 | Amiruddin et al. |
| 2012/0153902 A1* | 6/2012 | Yebka ................. H01M 10/443 |
| | | 320/148 |
| 2013/0260249 A1 | 10/2013 | Choi |
| 2017/0149100 A1 | 5/2017 | Ishii |
| 2018/0011143 A1 | 1/2018 | Bruch et al. |
| 2018/0198161 A1 | 7/2018 | Krasovitsky et al. |
| 2020/0106134 A1 | 4/2020 | Hasegawa et al. |
| 2021/0210802 A1 | 7/2021 | Cha et al. |

FOREIGN PATENT DOCUMENTS

| | | |
|---|---|---|
| JP | 2012-227035 A | 11/2012 |
| JP | 2013-539594 A | 10/2013 |
| JP | 2014-17056 A | 1/2014 |
| JP | 2015-5350 A | 1/2015 |
| JP | 2015-191853 A | 11/2015 |
| KR | 10-2011-0034997 A | 4/2011 |
| KR | 10-1106359 B1 | 1/2012 |
| KR | 10-2013-0024807 A | 3/2013 |
| KR | 10-2013-0111834 A | 10/2013 |
| KR | 10-2013-0126365 A | 11/2013 |
| KR | 10-2017-0128596 A | 11/2017 |
| KR | 10-2019-0100500 A | 8/2019 |
| KR | 10-2020-0058906 A | 5/2020 |
| WO | WO 2018/212027 A1 | 11/2018 |

OTHER PUBLICATIONS

Extended European Search Report for European Application No. 21880619.8, dated Jul. 16, 2024.

* cited by examiner

ACTIVATION PROTOCOL GENERATING METHOD, AND ACTIVATION METHOD AND DEVICE USING SAME

TECHNICAL FIELD

The present disclosure relates to a lithium secondary battery activation method and activation apparatus, and more particularly, to an activation protocol generation method adapted to apply a specific voltage range, and an activation method and activation apparatus using the activation protocol generation method. The present application claims priority to Korean Patent Application No. 10-2020-0134301 filed on Oct. 16, 2020 in the Republic of Korea, the disclosures of which are incorporated herein by reference.

BACKGROUND ART

Recently, as demand for portable electronic products such as notebook computers, video cameras, and portable telephones is rapidly increasing, and development of electric vehicles, energy storage batteries, robots, satellites, etc. is in full swing, research into high-performance secondary batteries capable of being repeatedly charged and discharged is being actively conducted.

Currently commercialized secondary batteries include nickel-cadmium batteries, nickel-hydrogen batteries, nickel-zinc batteries, and lithium secondary batteries. Among them, compared to nickel-based secondary batteries, lithium secondary batteries have almost no memory effect and thus are freely charged and discharged and have a very low self-discharge rate and have a high energy density. In general, such secondary batteries may be classified into cylindrical or prismatic can-type secondary batteries and pouch-type secondary batteries depending on outer casings or application forms.

A secondary battery may be used in the form of a single cell or in the form of a module in which a plurality of cells are electrically connected, depending on the type of external device using the second battery. For example, a small device such as a mobile phone can operate for a predetermined time period with the output and capacity of one cell, whereas a medium-sized or large-sized device such as a notebook computer, a portable DVD, a small personal computer (PC), an electric vehicle, and a hybrid electric vehicle needs to use a module including a plurality of cells due to problems of output and capacity.

A module is manufactured by connecting a protection circuit or the like to a core pack in which a plurality of cells are arranged in series and/or in parallel and connected to one another. When a prismatic or pouch-type cell is used as a unit cell, the unit cell can be easily manufactured by stacking wide surfaces to face each other and then connecting electrode terminals to one another by using a connecting member such as a bus bar. Accordingly, when a stereoscopic module having a hexahedral structure is manufactured, a prismatic or pouch-type cell is advantageous as a unit cell.

Because a pouch-type cell constitutes its exterior by using a pouch outer casing formed as a multi-layer including a metal layer (foil) and a synthetic resin layer coated on upper and lower surfaces of the metal layer, the pouch-type cell can contribute to significant reduction in the weight of secondary batteries and are changeable into various shapes, as compared with a cylindrical or prismatic cell using a metal can. Moreover, usage of pouch-type cells is gradually increasing.

In general, pouch-type cells are manufactured through a process of assembling a cell and a process of activating the cell.

A conventional pouch outer casing generally includes a lower outer casing in which an electrode assembly is accommodated, and an upper outer casing that seals an upper portion of the lower outer casing. A cell is assembled by accommodating the electrode assembly in an accommodating portion of the lower outer casing, making an edge around the accommodating portion of the lower outer casing adhere to an edge of the upper outer casing corresponding to the former edge, heat-sealing a closely adhered portion, putting the electrolyte in, and vacuum-sealing the remaining portion.

Because the cell is assembled in a discharged state, it can function as a battery only after being assembled and then being charged and activated. This is referred to as an activation or formation process.

In the activation process, a cell is mounted in an activation device, which is predetermined activation process equipment, for smooth current flow, and charging/discharging is performed under conditions necessary for activation. Due to characteristics of a cell, this activation process must be preceded during a first cycle in order to activate a positive electrode active material and generate a solid electrolyte interface (SEI) on a negative electrode. In the activation process, the SEI is finally formed on the surface of the negative electrode due to a reaction between the negative electrode active material and the electrolyte, and physical and mechanical soundness of this SEI determines performance of the cell until the lifespans of the cell and a secondary battery including the cell end.

A cell manufacturing process including the activation process is as follows. After the cell is assembled to have an air pocket, a jig formation operation for SEI formation is performed. It takes an aging time so that an electrolyte is sufficiently impregnated. An additional charge/discharge operation is needed. Gas is generated inside the cell due to charging/discharging. To remove this gas, the air pocket is punctured to suck in the gas, and a degassing operation of cutting out an unnecessary portion of an outer casing and sealing the outer casing is performed. Then, the cell is inspected and then shipped as a finished product.

In the degassing operation, when the gas is sucked in, the electrolyte inside the cell is also easily leaked. However, if a large number of pores are formed in an electrode active material, the electrolyte is trapped in the pores and thus is less leaked. The additional charge/discharge operation is performed to form the pores in the electrode active material, and is thus very important. However, when a lead time of the additional charge/discharge operation increases, this leads to a delay in the progress of the entire activation process, and also leads to a decrease in productivity. Therefore, there is a need for a method for shortening the progress time of an activation process including an additional charge/discharge operation.

DISCLOSURE

Technical Problem

The present disclosure is designed to solve the problems of the related art, and therefore the present disclosure is directed to providing an activation protocol generation method capable of shortening a lead time of an additional charge/discharge operation.

The present disclosure is designed to solve the problems of the related art, and therefore the present disclosure is directed to providing an activation method having a shortened lead time by using the activation protocol generation method.

The present disclosure is designed to solve the problems of the related art, and therefore the present disclosure is directed to providing an activation apparatus using the activation protocol generation method.

Technical Solution

In one aspect of the present disclosure, there is provided a method of generating a charge/discharge protocol of an additional charging/discharging operation included in an activation method, the activation method including a jig formation operation, an aging operation, and the additional charging/discharging operation with respect to assembled secondary batteries, the charge/discharge protocol generation method including operation (a) of measuring a secondary battery thickness increase rate over time while repeating charging/discharging between a first voltage and a second voltage higher than the first voltage with respect to a first secondary battery of the assembled secondary batteries; operation (b) of performing, at least once, an operation of performing operation (a) with respect to a different secondary battery of the assembled secondary battery that is the same model as the first secondary battery, after fixing the second voltage and changing the first voltage; operation (c) of determining one of first voltages except for a first voltage at a lowest rate from among measured secondary battery thickness increase rates as a lower limit voltage; and operation (d) of setting a protocol so that charging/discharging is repeated between the lower limit voltage and the second voltage.

The second voltage may be a full charge voltage of the assembled secondary batteries, and the first voltage may be a voltage greater than or equal to a full discharge voltage of the assembled secondary batteries.

The full charge voltage may be a voltage enabling a state of charge (SOC) of the assembled secondary batteries to have a determined value between 80% and 90%, and the full discharge voltage may be a voltage when the SOC of the assembled secondary batteries is 0%.

The secondary battery thickness increase rate may be obtained by subtracting a thickness of a corresponding secondary battery measured before charging/discharging in operation (a) from a thickness of the corresponding secondary battery measured after charging/discharging in operation (a) and by dividing a difference between the two thicknesses by a total time taken for charging/discharging.

In one aspect of the present disclosure, there is provided a method of generating a charge/discharge protocol of an additional charging/discharging operation included in an activation method, the activation method including a jig formation operation, an aging operation, and the additional charging/discharging operation with respect to assembled secondary batteries, the charge/discharge protocol generation method including measuring a secondary battery thickness increase rate over time while repeating charging/discharging between a full discharge voltage and a full charge voltage of the assembled secondary batteries, with respect to a first secondary battery of the assembled secondary batteries, and setting the measured secondary battery thickness increase rate as a reference; measuring a secondary battery thickness increase rate over time while repeating charging/discharging between a first voltage higher than the full discharge voltage and the full charge voltage, with respect to a second secondary battery of the assembled secondary batteries that is the same model as the first secondary battery; changing the first voltage, and then performing, at least once, an operation of measuring a secondary battery thickness increase rate over time while repeating charging/discharging between the changed first voltage and the full charge voltage, with respect to a third secondary battery of the assembled secondary batteries that is the same model as the first secondary battery; determining a lower limit voltage from among first voltages exhibiting greater rates than the reference from among the measured secondary battery thickness increase rates; and setting a protocol so that charging/discharging is repeated between the lower limit voltage and the full charge voltage.

The present disclosure also proposes an activation method using this additional charge/discharge activation protocol generation method. The activation method according to the present disclosure includes a jig formation operation for assembled secondary batteries; an aging operation; and an additional charge/discharge operation, and the additional charge/discharge operation is performed using a charge/discharge protocol obtained by an additional charge/discharge activation protocol generation method according to the present disclosure.

The present disclosure also provides an activation apparatus capable of performing such an activation method. The activation apparatus according to the present disclosure includes a charge/discharge device configured to perform charging/discharging with respect to assembled secondary batteries; and a control device configured to control an operation of the charge/discharge device according to a charge/discharge protocol.

The control device includes a processing unit including a program module for executing operation (a) of measuring a secondary battery thickness increase rate over time while repeating charging/discharging between a first voltage and a second voltage higher than the first voltage for a first secondary battery of the assembled secondary batteries; a program module for executing, at least once, an operation of performing operation (a) with respect to a second secondary battery of the assembled secondary batteries that is the same model as the first secondary battery, after fixing the second voltage and changing the first voltage; a program module for determining one of first voltages except for a first voltage at the time of showing a lowest rate from among measured secondary battery thickness increase rates as a lower limit voltage; and a program module for setting a protocol to repeat charging/discharging between the lower limit voltage and the second voltage. The control device controls the charge/discharge device to perform an additional charging/discharging operation for forming pores in an electrode active material, according to the protocol, after performing jig formation charge/discharge for SEI formation on the assembled secondary batteries and then having an aging time to sufficiently impregnate an electrolyte.

The activation apparatus may further include a thickness measuring unit configured to measure a thickness of the secondary battery. The control device may control a driving and measuring timing of the thickness measuring unit, and the program modules of the processing unit may calculate the secondary battery thickness increase rate by using the thickness measured by the thickness measuring unit.

Advantageous Effects

In an additional charge/discharge activation protocol generation method and an activation method using the additional charge/discharge activation protocol generation method, according to the present disclosure, a lead time of an additional charge/discharge process may be shortened during an activation process in a production process of a secondary battery including a pouch-type cell. Accordingly, a lead time of the entire activation process may be shortened, leading to an increase in productivity.

An additional charge/discharge activation process may sufficiently secure pores in an electrode active material before degassing. According to the present disclosure, because pores may be formed within a short period of time, a defect rate of the residual amount of an electrolyte after degassing may be reduced.

An activation apparatus according to the present disclosure is optimized for performing an additional charge/discharge activation protocol generation method and an activation method using the same. The activation apparatus needs only manpower sufficient to change secondary batteries to be charged and discharged one by one, and is able to automatically perform almost the entire charge/discharge process, thereby providing high productivity and efficiency.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Figure 1:
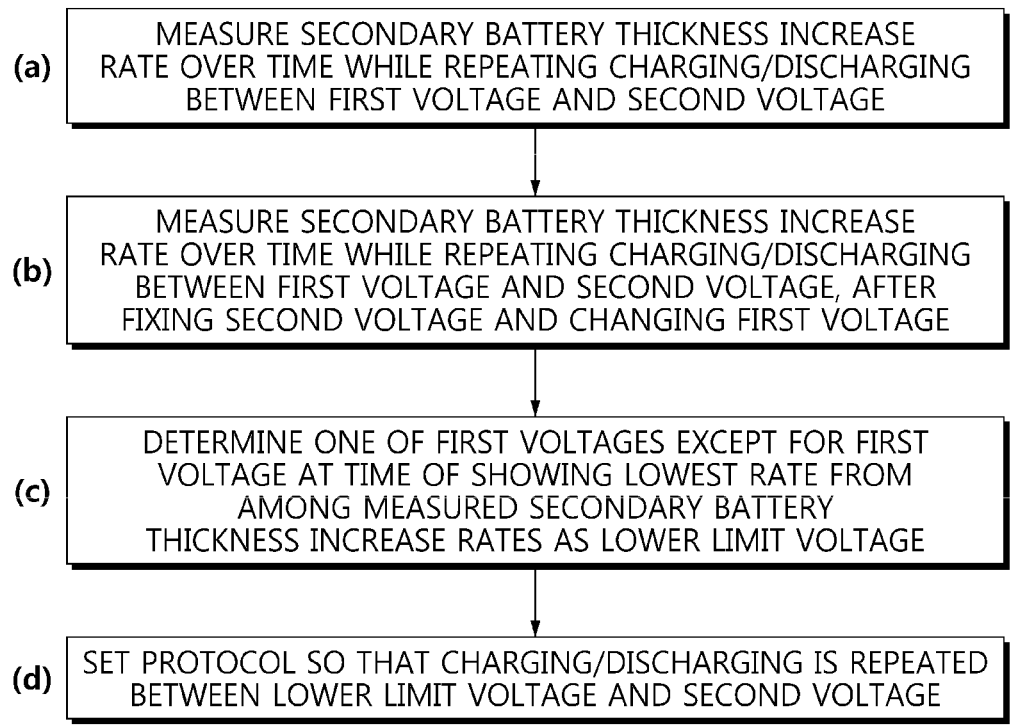
FIG. 1 is a flowchart of an additional charge/discharge activation protocol generation method according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In embodiments described below, a secondary battery are collectively referred to as a battery in which lithium ions act as working ions during charging and discharging to induce an electrochemical reaction at a positive electrode and a negative electrode.

Even when the name of a secondary battery is changed depending on the type of electrolyte or separator used in the secondary battery, the type of battery case (or a packing material) used to pack the secondary battery, the internal or external structure of the secondary battery, and the like, all batteries in which lithium ions are used as working ions need to be interpreted as being included in the category of the secondary battery.

In addition, the secondary battery is not limited by the number of elements constituting the secondary battery. Therefore, the secondary battery needs to be interpreted as including not only a single cell including an electrode assembly of a positive electrode/separator/negative electrode and an electrolyte in one battery case, but also an assembly of a single cell, a module in which a plurality of assemblies are connected in series and/or in parallel, a pack in which a plurality of modules are connected in series and/or in parallel, and a battery system in which a plurality of packs are connected in series and/or parallel.

An example of a secondary battery assembly and activation process to which a method according to the present disclosure is applicable is as follows.

An assembling operation includes receiving and sealing an electrode assembly and an electrolyte in a battery case in a manufacturing room.

First, an electrode assembly including a positive electrode, a negative electrode, and a separator interposed therebetween is manufactured. The manufacturing of the electrode assembly includes applying an electrode slurry including an active material and a binder to an electrode current collector to manufacture the positive electrode and the negative electrode, respectively, and then interposing the separator between the positive electrode and the negative electrode. The manufacturing of the electrode assembly is not particularly limited and may be performed according to a known method. In addition, the electrode assembly is not particularly limited as long as it has a structure including a positive electrode, a negative electrode, and a separator, and, the structure may be, for example, a jelly-roll type, a stack type, or a stack/folding type structure.

The negative electrode in the electrode assembly may include a carbon-based negative electrode active material. The carbon-based negative electrode active material may be artificial graphite or natural graphite.

The electrolyte may include an organic solvent and a lithium salt. The organic solvent is not limited as long as it can minimize decomposition due to an oxidation reaction during charging/discharging of a battery and exhibit desired properties. For example, the organic solvent may be a cyclic carbonate, a linear carbonate, an ester, an ether, or a ketone. These may be used alone, or two or more of them may be used in combination. Among the organic solvents, a carbonate-based organic solvent may be preferably used. Examples of the cyclic carbonate include ethylene carbonate (EC), propylene carbonate (PC) and butylene carbonate (BC), and representative examples of the linear carbonate include dimethyl carbonate (DMC), diethyl carbonate (DEC), dipropyl carbonate (DPC), ethylmethyl carbonate (EMC), methylpropyl carbonate (MPC) and ethylpropyl carbonate (EPC). Lithium salts commonly used in electrolytes of lithium secondary batteries, such as $LiPF_6$, $LiAsF_6$, $LiCF_3SO_3$, $LiN(CF_3SO_2)_2$, $LiBF_4$, $LiBF_6$, $LiSbF_6$, $LiN(C_2F_5SO_2)_2$, $LiAlO_4$, $LiAlCl_4$, $LiSO_3CF_3$, and $LiClO_4$, may be used as the lithium salt without limitations, and these may be used alone, or two or more of them may be used in combination.

The battery case may preferably be a pouch made of an aluminum laminate sheet.

Next, cells assembled as above are transferred to a formation room to proceed with an activation process. The activation process includes a jig formation operation for forming an SEI, an aging operation of sufficiently impregnating an electrolyte, and an additional charge/discharge operation for forming pores in an electrode active material. The present disclosure proposes, particularly, a method of generating a charge/discharge protocol in an additional charge/discharge operation.

The inventors of the present disclosure determine that an activation voltage has a major influence on formation of pores in an electrode. The present disclosure proposes a method of the most preferably determining a charge/discharge voltage range from the viewpoint of productivity in the additional charge/discharge operation by focusing on such a voltage range. When a predetermined charge/discharge voltage range is determined as proposed by the present disclosure and used as a charge/discharge protocol, sufficient pores may be secured within the same time period, thereby reducing both the lead time of the additional charge/discharge operation and the lead time of the entire activation process.

The inventors of the present disclosure have come to the present disclosure by discovering that, when pores are formed in an electrode active material, the thickness of a secondary battery increases, and, when the level of an increase in the thickness of the secondary battery while changing a charge/discharge voltage is ascertained, an appropriate charge/discharge range may be determined.

A secondary battery has an upper limit that can be physically charged and a lower limit that can be physically discharged. However, in an actual use environment, charging/discharging is not performed up to the physical upper and lower limits. Instead, within the physical upper and lower limits of the secondary battery, a use area is appropriately set in terms of safety, lifespan, and energy efficiency of the secondary battery, and charging and discharging are performed only within the use area.

In other words, a lower limit of the use area is set higher than a physical limit discharge point, and an upper limit of the use area is set lower than a physical limit charge point. The use area may be variously set according to characteristics of the secondary battery, usage environments, required charge/discharge capacities, energy outputs, and the like. Hereinafter, it is defined that the secondary battery is completely discharged (or fully discharged) when the state of the secondary battery reaches the lower limit of the set use area during a discharging process of the secondary battery. It is also defined that the secondary battery is completely charged (or fully charged) when the state of the secondary battery reaches the upper limit of the set use area during a charging process of the secondary battery.

Conventionally, there is a case in which additional charging/discharging is performed by repeating charging/discharging between a full charge voltage and a full discharge voltage. Although the full charge voltage and the full discharge voltage vary depending on the type of cell, there is, for example, a case where charging/discharging is performed in a 4.35 V to 3.0 V section. At this time, it took 750 minutes to form pores in an electrode active material to a desired degree. However, it was confirmed that, when additional charging/discharging was performed with a charging/discharging voltage range obtained using the activation protocol generation method proposed by the present disclosure, the time period to form pores in an electrode active material could be reduced to 440 minutes. An activation protocol generation method according to the present disclosure will now be described in detail with specific examples.

FIG. 1 is a flowchart of an additional charge/discharge activation protocol generation method according to an embodiment of the present disclosure.

Referring to FIG. 1, first, a secondary battery thickness increase rate over time is measured while repeating charging/discharging between a first voltage and a second voltage higher than the first voltage with respect to any one of assembled secondary batteries [operation (a)].

The second voltage may be a full charge voltage of the secondary batteries, and the first voltage may be a voltage greater than or equal to a full discharge voltage of the secondary batteries. The full charge voltage and the full discharge voltage may vary depending on how the use area is set as mentioned above. For example, the full charge voltage may be a voltage enabling an SOC of the secondary batteries to have a determined value between 80% and 90%, and the full discharge voltage may be a voltage when the SOC of the secondary batteries is 0%.

According to the present embodiment, a case in which the second voltage is a full charge voltage of the secondary batteries and is a voltage enabling the SOC of the secondary batteries to be 85% is taken as an example. The voltage enabling the SOC to be 85% may vary depending on a secondary battery model. However, in the secondary battery described in the present embodiment, the voltage is 4.35 V. According to the present embodiment, a case in which the first voltage is a full charge voltage of the secondary batteries and is a voltage enabling the SOC of the secondary batteries to be 0% is taken as an example. The voltage enabling the SOC to be 0% may vary depending on a secondary battery model. However, in the secondary battery described in the present embodiment, the voltage is 3.0 V.

Then, in operation (a), which is a first operation, while charging/discharging between 3.0 V and 4.35 V with respect to any one secondary battery is being repeated, a secondary battery thickness increase rate over time is measured. The number of repetitions of charging/discharging may be arbitrarily set to be one or more. The secondary battery thickness increase rate may be a value obtained by subtracting a thickness of the secondary battery measured before charging/discharging in operation (a) from a thickness of the secondary battery measured after charging/discharging in operation (a) and by dividing a difference between the two thicknesses by a total time taken for charging and discharging.

Figure 2:
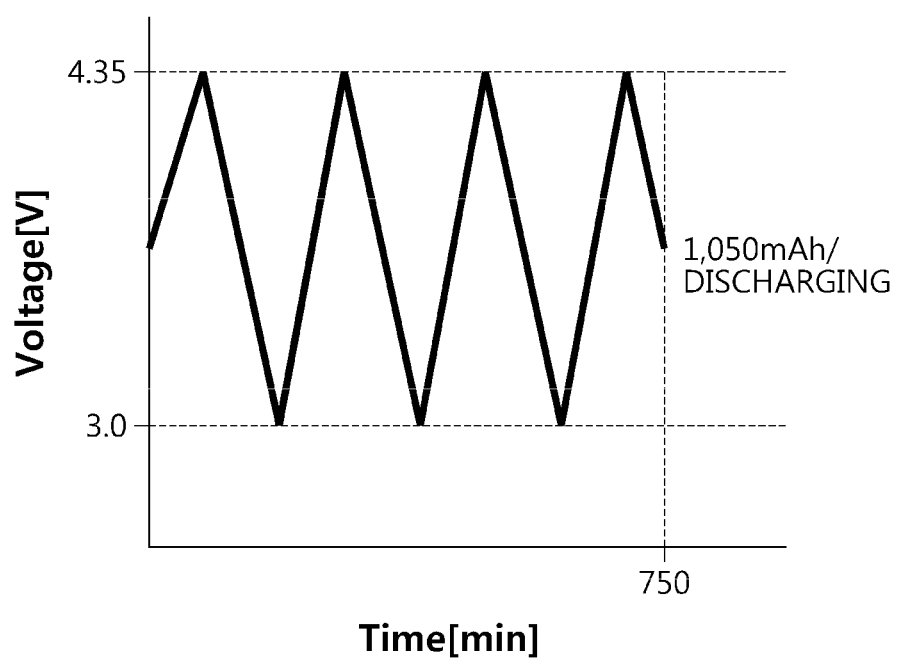
FIGS. 2 through 6 show various charge/discharge protocols that may be taken as an example in the additional charge/discharge activation protocol generation method according to an embodiment of the present disclosure.

For example, a charge/discharge protocol of operation (a) may be as shown in FIG. 2. FIGS. 2 through 6 show various charge/discharge protocols that may be taken as an example in the additional charge/discharge activation protocol generation method according to an embodiment of the present disclosure.

After the secondary battery is aged in a state where the SOC is charged to, for example, 65%, in the previous jig formation operation, additional charging/discharging may be performed, and the additional charging/discharging may be performed according to the additional charge/discharge protocol as shown in FIG. 2. When the secondary battery reaches a full charge voltage of 4.35 V by performing additional charging in an SOC 65% state, discharging is performed. When the secondary battery reaches a full discharge voltage of 3.0 V, charging is performed until the secondary battery reaches the full charge voltage again. When the secondary battery reaches the full charge voltage, the secondary battery is discharged until the secondary battery reaches the full discharge voltage again. For example, a cycle including one time of charging and one time of discharging is repeated 4 times. A total time period to do this is 750 minutes. After charging/discharging is performed according to the charge/discharge protocol shown in FIG. 2, the secondary battery thickness increase rate is obtained. The secondary battery thickness increase rate is calculated by subtracting a thickness of the secondary battery measured before charging/discharging from a thickness of the secondary battery measured after charging/discharging and by dividing a difference between the two thicknesses (thickness variation) by a total time taken for charging and discharging. The charge/discharge profile of FIG. 2 may be, for example, a reference.

Figure 7:
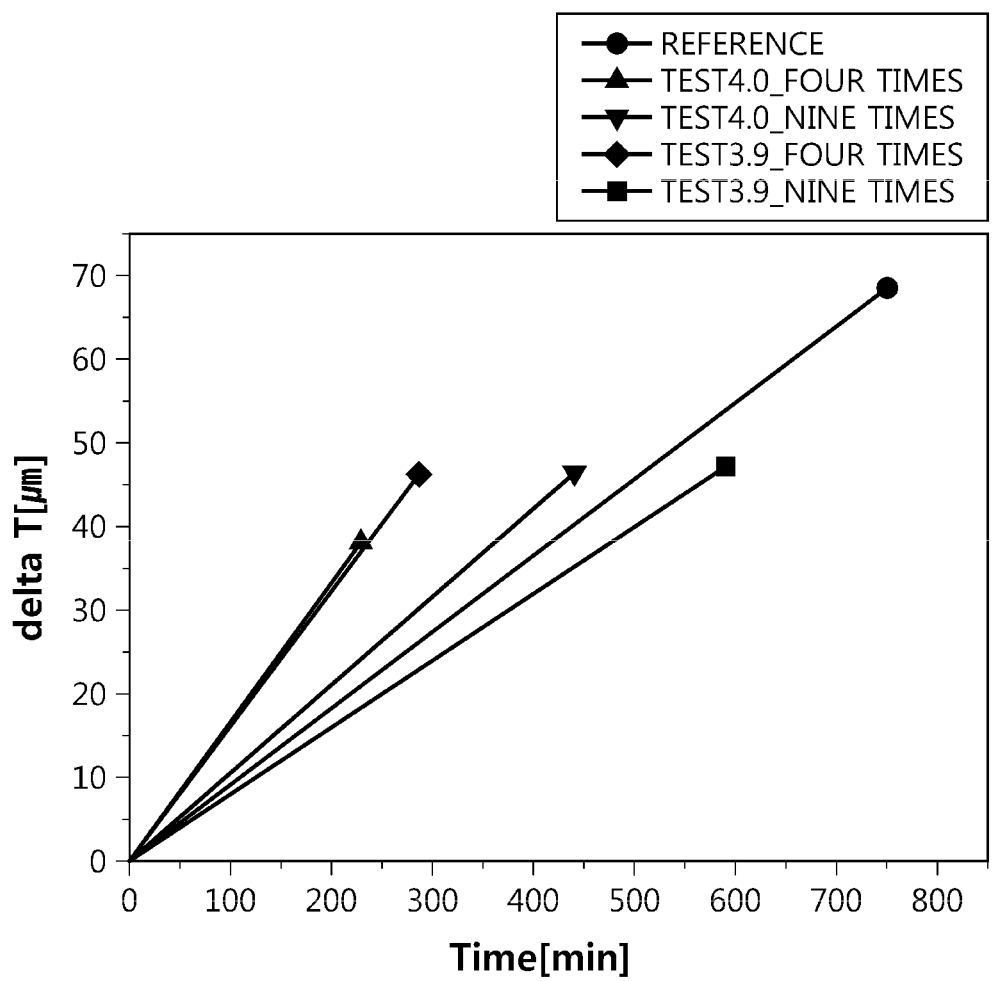
FIG. 7 is a graph showing a secondary battery thickness increase rate obtained for each secondary battery after charging/discharging is performed according to FIGS. 2 through 6.

FIG. 7 is a graph showing a secondary battery thickness increase rate obtained for a secondary battery after charging/discharging is performed according to FIG. 2. For example, when the thickness variation (delta T) is about 70 μm when a total time taken for charging/discharging is 750 minutes, a circled dot is displayed as in FIG. 7, and the slope of a line connecting a zero point to the circled point corresponds to the secondary battery thickness increase rate.

Next, after the second voltage is fixed and the first voltage is changed, the same operation as operation (a) is performed with respect to another secondary battery that is the same model as the former secondary battery [operation (b)]. Operation (b) is performed at least once.

According to the present embodiment, a case where the second voltage is 4.35 V and the initial first voltage is 3.0 V is taken as an example. Because the initial first voltage is the full discharge voltage, the changed first voltage may be greater than the full discharge voltage. For example, the changed first voltage may be 4.0 V as in FIGS. 3 and 4, or may be 3.9 V as in FIGS. 5 and 6. It is only necessary that the first voltage is less than the second voltage.

Figure 3:
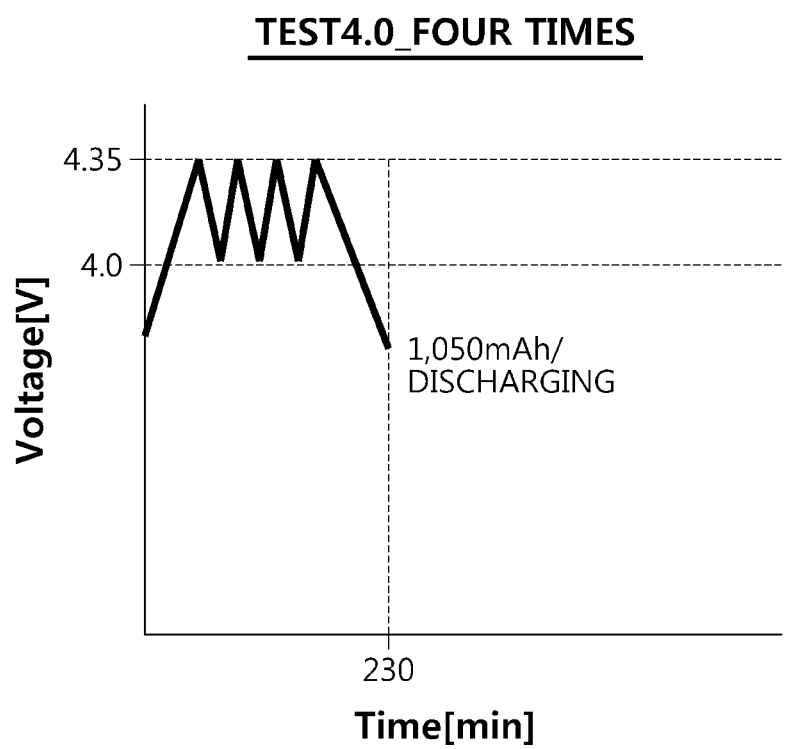
Figure 4:
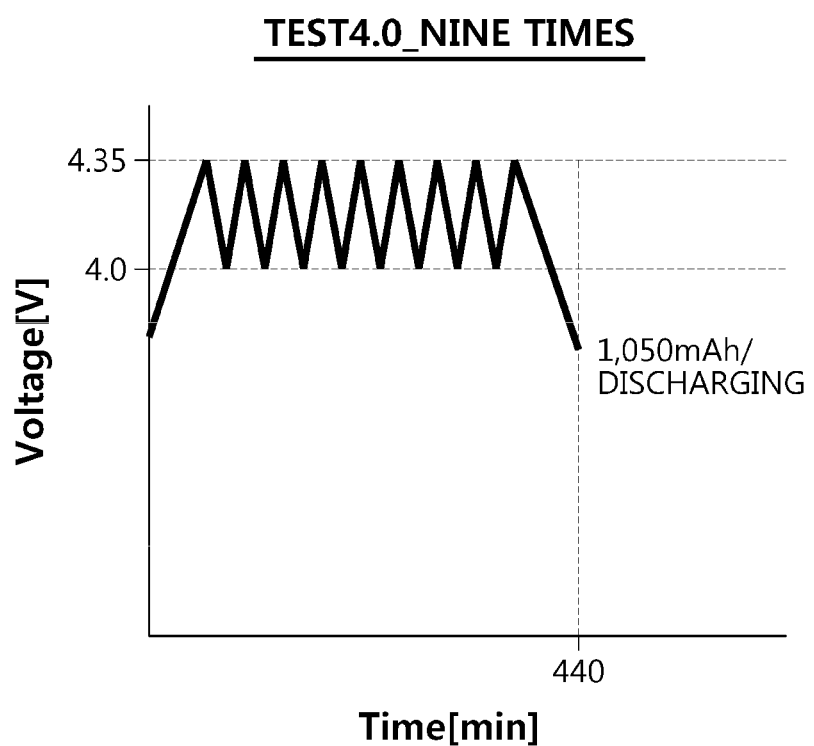
Figure 5:
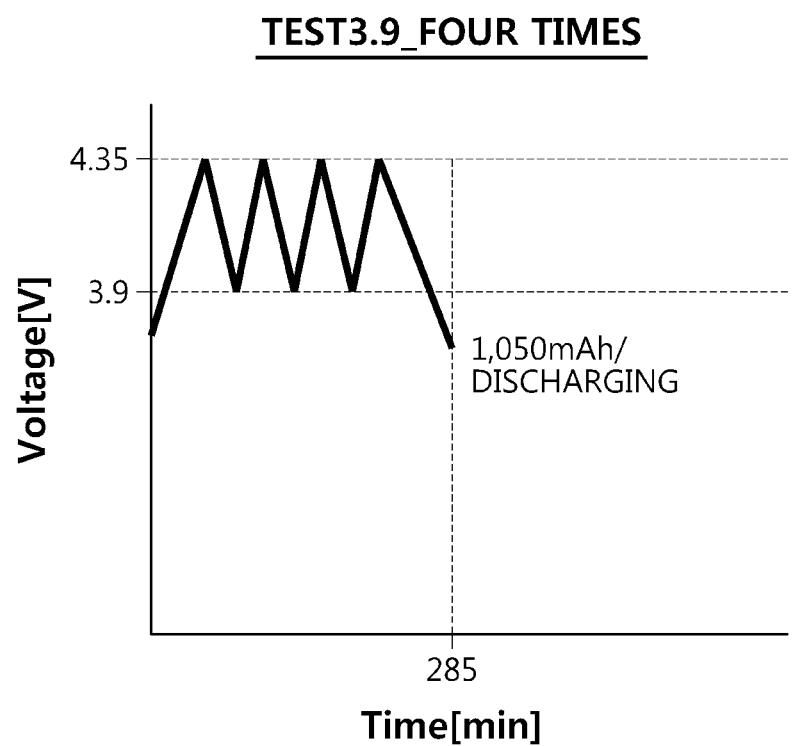
Figure 6:
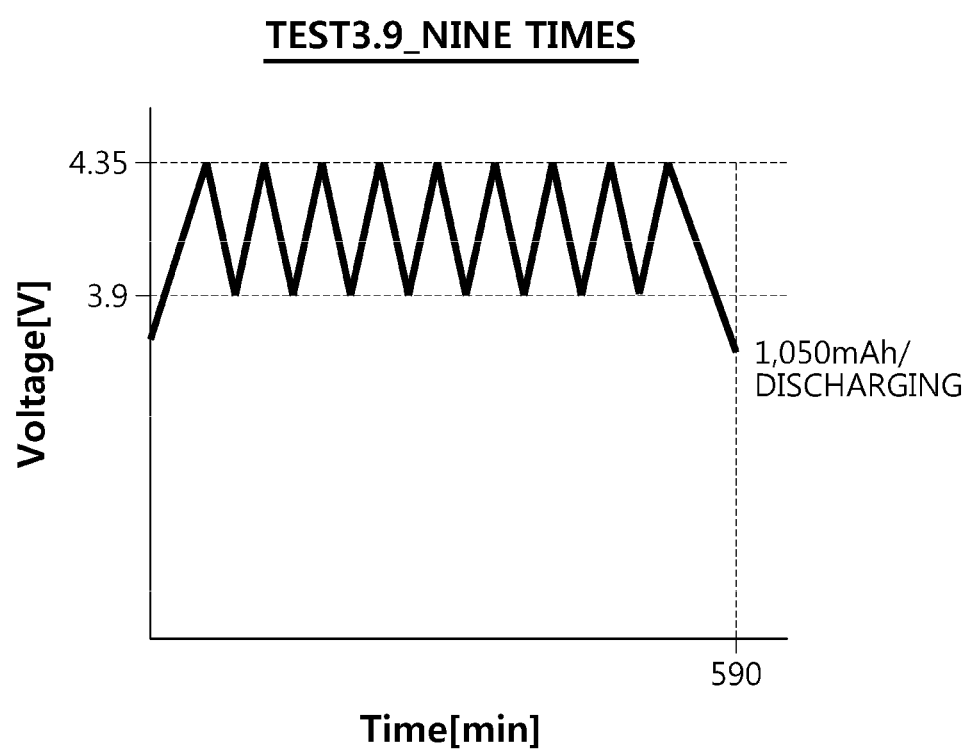

When operation (b) is performed one or more times, operation (b) may be performed by leaving the changed first voltage as it is and changing the number of repetitions of charging/discharging. For example, the number of charge/discharge cycles in FIGS. 3 and 5 is 4, which is the same as that of FIG. 2, but FIGS. 4 and 6 show a case where the number of charge/discharge cycles is 9, which is greater than that of FIG. 2. In other words, as shown in FIGS. 3 through 6, the secondary batteries are charged and discharged according to various charge/discharge protocols having different first voltages or performing different number of times of charging/discharging, and then different secondary battery thickness increase rates are obtained for such different cases.

One or more secondary battery thickness increase rates obtained by operation (b) may be added as data as further shown in FIG. 7. FIG. 7 is a graph showing a secondary battery thickness increase rate obtained for each secondary battery after charging/discharging is performed according to FIGS. 3 through 6.

Subsequently, one of first voltages except for a first voltage at a lowest rate from among the measured secondary battery thickness increase rates is determined as a lower limit voltage [operation (c)]. Referring to FIG. 7, when charging/discharging is repeated 9 times between 3.9 V and 4.35 V according to FIG. 6, the secondary battery thickness increase rate is the lowest (the slope of the graph is the smallest). Therefore, the lower limit voltage is determined from among first voltages of 4 V and 3.0 V except for 3.9 V. According to the present embodiment, when the first voltage is 3.0 V, it takes 750 minutes to repeat charging/discharging 4 times. However, when the first voltage is 4 V, it takes 230 minutes to repeat charging/discharging 4 times, and it takes 440 minutes to repeat charging/discharging 9 times. Therefore, considering that it is advantageous that the time taken to complete charging/discharging is short, 4 V among 3.0 V and 4 V is suitable as the lower limit voltage and thus may be determined as the lower limit voltage.

Next, a protocol is set to repeat charging/discharging between the lower limit voltage and the second voltage [operation (d)]. Although using the same lower limit voltage, when charging/discharging is repeated between 4 V and 4.35 V 4 times by referring to FIG. 7, a thickness variation is less than that when charging/discharging is repeated between 4 V and 4.35 V 9 times. Therefore, the case where the number of times of charging/discharging is 9 is suitable as a case satisfying a condition that the thickness variation is large. The thickness variation being large refers to many pores being formed in an electrode active material and thus the volume of the electrode active material being expanded. Therefore, a new charge/discharge protocol set in operation (d) is determined as repeating charging/discharging 9 times between 4 V and 4.35 V. The additional charge/discharge protocol determined in this way may be used as an established additional charge/discharge protocol in a next additional charge/discharge process.

According to another embodiment, when operation (a) is performed, a case in which a charge/discharge protocol as in FIG. 2 is followed may be specially used as a reference, that is, a reference point. A result of measuring the secondary battery thickness increase rate over time while repeating charging/discharging between the full discharge voltage and the full charge voltage is served as a reference.

Then, when operation (b) is performed, a secondary battery thickness increase rate over time is measured while repeating charging/discharging between the first voltage higher than the full discharge voltage and the full charge voltage, with respect to another secondary battery that is the same model as the former secondary battery. After further changing the first voltage, operation (b) is further repeated.

When operation (c) is performed, a lower limit voltage may be determined from among the first voltages exhibiting greater rates than the reference from among the measured secondary battery thickness increase rates. Operation (d) may be ended by setting a new additional charge/discharge protocol to repeat charge/discharge between the determined lower limit voltage and the full charge voltage.

When additional charge/discharge is performed according to the new additional charge/discharge protocol obtained according to the present disclosure, the secondary battery thickness increase rate is greater than that in a reference case. In other words, when additional charge/discharge is performed according to the new additional charge/discharge protocol obtained according to the present disclosure, pores may be formed in an electrode active material within a shorter time period than in the case of performing additional charging/discharging while repeating charging/discharging between the full discharge voltage and the full charge voltage. This results in increased productivity.

In other words, according to the present disclosure, a charge/discharge voltage range is reduced compared to the reference case, leading to a reduction in the process lead time. The present disclosure is an activation protocol generation method adapted to apply a specific voltage range. The present disclosure proposes an additional charge/discharge protocol generation method that enables sufficient pores to be secured within the same or shorter time period as or than in the related art.

The present disclosure also proposes an activation method using this additional charge/discharge activation protocol generation method. The activation method according to the present disclosure includes a jig formation operation for assembled secondary batteries; an aging operation; and an additional charge/discharge operation, and the additional charge/discharge operation is performed using a charge/discharge protocol obtained by an additional charge/discharge activation protocol generation method according to the present disclosure.

Figure 8:
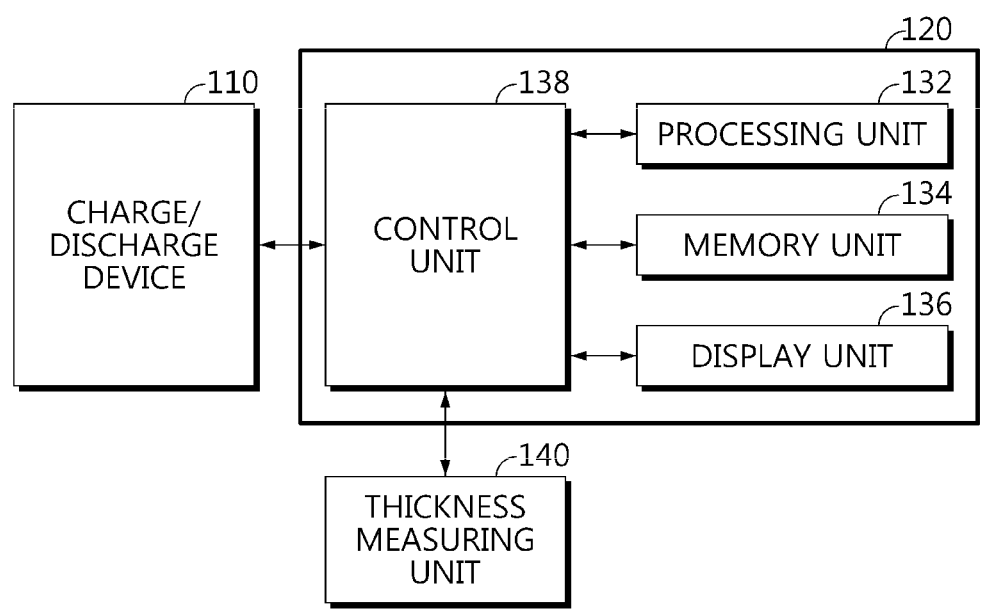
FIG. 8 is a schematic diagram of an activation apparatus according to another embodiment of the present disclosure.

The present disclosure also provides an activation apparatus capable of performing such an activation method. FIG. 8 is a schematic view of an activation apparatus according to another embodiment of the present disclosure.

Referring to FIG. 8, an activation apparatus 100 includes a charge/discharge device 110 and a control device 120.

The charge/discharge device 110 is capable of charging/discharging assembled secondary batteries. The charge/discharge device 110 is a device for charging/discharging a cell for activation, and may be an existing charging/discharging device. The charge/discharge device 110 may include a charging/discharging jig, a charging circuit, a discharging circuit, and the like.

The control device 120 controls an operation of the charge/discharge device 110 according to a charge/discharge protocol. The control device 120 is electrically connected to the charge/discharge device 110. The control device 120 controls the charging or discharging of the charge/discharge device 110 and, at the same time, controls switching of a charging or discharging mode.

For example, the charging circuit of the charge/discharge device 110 supplies power for charging a cell in the charging mode, and the charging circuit starts and stops an operation according to a start signal of the control device 120. To perform CC charging, CV charging, or CC-CV charging, the charging circuit includes a constant current circuit and a constant voltage circuit.

The discharging circuit of the charge/discharge device 110 functions to discharge a cell in the discharging mode. The discharging circuit also starts and stops an operation according to the start signal of the control device 120.

The control device 120 may include a processing unit 132, a memory unit 134, a display unit 136, and a control unit 138.

The processing unit 132 includes a program module for performing operation (a) of measuring a secondary battery thickness increase rate over time while repeating charging/discharging between a first voltage and a second voltage higher than the first voltage with respect to any one secondary battery; a program module for performing, at least once, an operation of performing operation (a) with respect to another secondary battery that is the same model as the any one secondary battery, after fixing the second voltage and changing the first voltage; a program module for determining one of first voltages except for a first voltage at the time of showing a lowest rate from among the measured secondary battery thickness increase rates as a lower limit voltage; and a program module for setting a protocol to repeat charging/discharging between the lower limit voltage and the second voltage. These program modules are capable of implementing the above-described additional charge/discharge protocol generation method.

The memory unit 134 is a recording medium for storing control programs and data related to calculation and judgment. For example, the memory unit 134 records a cell voltage measured for each time period while charging/discharging the cell. The memory unit 134 may measure an electrode thickness before charging/discharging starts and after charging/discharging ends, and store a difference between the measured electrode thicknesses, that is, a variation in the electrode thickness. The memory unit 134 may also record a total time taken for charging/discharging. The display unit 136 may display, for example, a graph as shown in FIG. 7 or a result such as the determined lower limit voltage. The display unit 136 may be, for example, a display device such as a computer monitor.

The control unit 138 controls the entire process of the activation apparatus 100, based on the control programs stored in the memory unit 134.

In detail, as described above, the control unit 138 charges-maintains-discharges the cell by operating the charge/discharge device 110. The control unit 138 measures the cell voltage for each time period and stores a result of the measurement in the memory unit 134. The control unit 138 may display a charge/discharge profile on the display unit 136, with the stored result. The control unit 138 may implement an additional charge/discharge protocol generation method according to the present disclosure by operating the processing unit 132. The control unit 138 may store, in the memory unit 134, the lower limit voltage as a determination result and the charge/discharge protocol including the lower limit voltage, and may display the same on the display unit 136.

The activation apparatus 100 may further include a thickness measuring unit 140 for measuring a thickness of the secondary battery. The control device 120 controls a driving and measuring timing of the thickness measuring unit 140, and the thickness measured by the thickness measuring unit 140 may be stored in the memory unit 134. The program module of the processing unit 132 may read the thickness and the total time taken for charging/discharging from the memory unit 134 to calculate the secondary battery thickness increase rate.

The activation apparatus 100 is not used only for generating an additional charge/discharge protocol, but also controls the charge/discharge device 110 to perform an additional charging/discharging operation for forming pores in an electrode active material, according to the protocol, after performing jig formation charge/discharge for SEI formation on secondary batteries and then having an aging time to sufficiently impregnate an electrolyte.

For example, in the jig formation operation for SEI formation, when an operator mounts a secondary battery on the charge/discharge device 110 of the activation apparatus 100, the control device 120 controls the charge/discharge device 110 to perform, for example, CC-CV charging, with respect to the secondary battery. In the jig formation operation, there is a preset protocol, and thus control is performed according to the preset protocol. For example, in order to make a small number of SEI nuclei at the beginning of production and then grow them to make a uniform SEI film, there may be a protocol for charging until reaching 65% SOC by applying current at 0.1 C-rate for about 3 hours. As another example, there may be a protocol for performing an operation of initially applying a relatively high C-rate current to generate the nucleus of an SEI film and a subsequent operation of maintaining a relatively low C-rate current to grow the nucleus. The jig formation operation may vary at any time.

For the subsequent aging operation, the control device 120 stops driving of the charge/discharge device 110. The operator takes out the secondary battery and has an aging time in an aging room. When the operator mounts an aging-completed secondary battery on the charge/discharge device 110 of the activation apparatus 100 again, the charge/discharge device 110 is driven according to the additional charge/discharge protocol to perform an additional charging/discharging operation for the secondary battery.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A method of generating a charge/discharge protocol of an additional charging/discharging operation included in an activation method, the activation method comprising a jig formation operation, an aging operation, and the additional charging/discharging operation with respect to assembled secondary batteries, the charge/discharge protocol generation method comprising:
   operation (a) of measuring a secondary battery thickness increase rate over time while repeating charging/discharging between a first voltage and a second voltage higher than the first voltage with respect to a first secondary battery of the assembled secondary batteries;
   operation (b) of performing, at least once, an operation of performing operation (a) with respect to a different secondary battery of the assembled secondary batteries that is a same model as the first secondary battery, after fixing the second voltage and changing the first voltage;
   operation (c) of determining one of first voltages except for a first voltage at a lowest rate among measured secondary battery thickness increase rates, as a lower limit voltage; and
   operation (d) of setting a protocol to repeat charging/discharging between the lower limit voltage and the second voltage.

2. The charge/discharge protocol generation method of claim 1, wherein the second voltage is a full charge voltage of the assembled secondary batteries, and the first voltage is a voltage greater than or equal to a full discharge voltage of the assembled secondary batteries.

3. The charge/discharge protocol generation method of claim 2, wherein the full charge voltage is a voltage enabling a state of charge (SOC) of the assembled secondary batteries to have a determined value between 80% and 90%, and the full discharge voltage is a voltage when the SOC of the assembled secondary batteries is 0%.

4. The charge/discharge protocol generation method of claim 1, wherein the secondary battery thickness increase rate is obtained by subtracting a thickness of a corresponding secondary battery measured before charging/discharging in operation (a) from a thickness of the corresponding secondary battery measured after charging/discharging in operation (a) and by dividing a difference between the two thicknesses by a total time taken for charging/discharging.

5. The charge/discharge protocol generation method of claim 1, wherein, when determining one of first voltages as the lower limit voltage, a first voltage when a total time taken for charging/discharging is relatively short is determined as the lower limit voltage.

6. The charge/discharge protocol generation method of claim 1, wherein operation (b) is performed by changing the number of times of repetitions of charging/discharging.

7. The charge/discharge protocol generation method of claim 6, wherein, when the protocol is set, the number of times of repetitions of charging/discharging when a variation in a secondary battery thickness is relatively large is selected.

8. A method of generating a charge/discharge protocol of an additional charging/discharging operation included in an activation method, the activation method comprising a jig formation operation, an aging operation, and the additional charging/discharging operation with respect to assembled secondary batteries, the charge/discharge protocol generation method comprising:
   measuring a secondary battery thickness increase rate over time while repeating charging/discharging between a full discharge voltage and a full charge voltage of the assembled secondary batteries, with respect to a first secondary battery of the assembled secondary batteries, and setting the measured secondary battery thickness increase rate as a reference;
   measuring a secondary battery thickness increase rate over time while repeating charging/discharging between a first voltage higher than the full discharge voltage and the full charge voltage, with respect to a second secondary battery of the assembled secondary batteries that is a same model as the first secondary battery;
   changing the first voltage, and then performing, at least once, an operation of measuring a secondary battery thickness increase rate over time while repeating charging/discharging between the changed first voltage and the full charge voltage, with respect to a third secondary battery of the assembled secondary batteries that is a same model as the first secondary battery;
   determining a lower limit voltage from among first voltages having greater rates than the reference among the measured secondary battery thickness increase rates; and
   setting a protocol to repeat charging/discharging between the lower limit voltage and the full charge voltage.

9. An activation method comprising:
   a jig formation operation with respect to assembled secondary batteries;
   an aging operation; and
   an additional charge/discharge operation,
   wherein the additional charge/discharge operation is performed using a charge/discharge protocol obtained according to the additional charge/discharge activation protocol generation method of claim 1.

10. An activation apparatus comprising:
   a charge/discharge device configured to perform charging/discharging with respect to assembled secondary batteries; and
   a control device configured to control an operation of the charge/discharge device according to a charge/discharge protocol,
   wherein the control device comprises:
      a processing unit comprising a program module for executing operation (a) of measuring a secondary battery thickness increase rate over time while repeating charging/discharging between a first voltage and a second voltage higher than the first voltage with respect to a first secondary battery of the assembled secondary batteries;
      a program module for executing, at least once, an operation of performing operation (a) with respect to a second secondary battery of the assembled secondary batteries that is a same model as the first secondary battery, after fixing the second voltage and changing the first voltage;
      a program module for determining one of first voltages except for a first voltage at the time of showing a lowest rate from among measured secondary battery thickness increase rates as a lower limit voltage; and a program module for setting a protocol to repeat charging/discharging between the lower limit voltage and the second voltage, and wherein the control device controls the charge/discharge device to perform an additional charging/discharging operation for forming pores in an electrode active material, according to the protocol, after performing jig formation charge/discharge for SEI formation on the assembled secondary batteries and then having an aging time to sufficiently impregnate an electrolyte.

11. The activation apparatus of claim 10, further comprising a thickness measuring unit configured to measure a thickness of the secondary battery, wherein the control device controls a driving and measuring timing of the thickness measuring unit, and the program modules of the processing unit calculates the secondary battery thickness increase rate by using the thickness measured by the thickness measuring unit.

12. An activation method comprising:

a jig formation operation with respect to assembled secondary batteries;

an aging operation; and an additional charge/discharge operation, wherein the additional charge/discharge operation is performed using a charge/discharge protocol obtained according to the additional charge/discharge activation protocol generation method of claim 8.

* * * * *